United States Patent
Miyamoto et al.

(10) Patent No.: US 9,137,423 B2
(45) Date of Patent: Sep. 15, 2015

(54) COLOR PRINTING SYSTEM WITH COLOR ADJUSTMENT UNIT, COLOR PRINTING METHOD WITH COLOR ADJUSTMENT, AND NON-TRANSITORY COMPUTER READABLE RECORDING MEDIUM STORING COLOR PRINTING PROGRAM WITH COLOR ADJUSTMENT

(71) Applicant: KONICA MINOLTA, INC., Chiyoda-ku (JP)

(72) Inventors: Yoshio Miyamoto, Shinagawa-ku (JP); Tsuyoshi Sugita, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 36 days.

(21) Appl. No.: 14/222,109

(22) Filed: Mar. 21, 2014

(65) Prior Publication Data
US 2014/0285832 A1 Sep. 25, 2014

(30) Foreign Application Priority Data
Mar. 25, 2013 (JP) .................................. 2013-062610

(51) Int. Cl.
G03F 3/08 (2006.01)
H04N 1/46 (2006.01)
H04N 1/60 (2006.01)

(52) U.S. Cl.
CPC ........................................ *H04N 1/60* (2013.01)

(58) Field of Classification Search
USPC ..................... 358/2, 5, 6, 8, 11, 12, 14, 17, 1, 358/518–523, 504, 2.1
See application file for complete search history.

(56) References Cited

U.S. PATENT DOCUMENTS

| 5,791,251 A | * | 8/1998 | Kistler et al. | .................. 101/484 |
| 6,027,201 A | * | 2/2000 | Edge | ................................ 347/19 |
| 6,035,076 A | * | 3/2000 | Nagase | .......................... 382/294 |

(Continued)

FOREIGN PATENT DOCUMENTS

| JP | 2005-181673 A | 7/2005 |
| JP | 2006-094040 A | 4/2006 |

(Continued)

OTHER PUBLICATIONS

Office Action (Notification of Reason for Refusal) issued on Mar. 3, 2015, by the Japanese Patent Office in corresponding Japanese Patent Application No. 2013-062610 and an English translation of the Office Action. (8 pages).

*Primary Examiner* — Barbara Reinier
(74) *Attorney, Agent, or Firm* — Buchanan Ingersoll & Rooney PC

(57) ABSTRACT

There is provided a color printing system including: a specification unit that specifies an area which has predetermined colors from printing target image data; a printing unit that prints the image data; a color measurement unit that measures the colors of the area, which is specified by the specification unit, with regard to a printed matter; a recording unit that records color measurement results whenever the image data is printed; and a color adjustment unit that, when a predetermined number of color measurement results of the predetermined colors are completed, executes color adjustment using the color measurement results. Therefore, it is possible to prevent accuracy from being lowered while the color adjustment is effectively executed.

18 Claims, 9 Drawing Sheets

(56) References Cited

U.S. PATENT DOCUMENTS

| | | | |
|---|---|---|---|
| 6,744,531 B1* | 6/2004 | Mestha et al. | 358/1.9 |
| 6,853,464 B1* | 2/2005 | Ueda et al. | 358/1.9 |
| 7,248,272 B2* | 7/2007 | Harada et al. | 347/116 |
| 7,505,173 B2* | 3/2009 | Viturro et al. | 358/1.9 |
| 7,755,799 B2* | 7/2010 | Paul et al. | 358/1.9 |
| 7,903,279 B2* | 3/2011 | Noguchi et al. | 358/1.2 |
| 8,264,704 B2* | 9/2012 | Jackson et al. | 358/1.14 |
| 8,274,717 B2* | 9/2012 | McElvain et al. | 358/515 |
| 8,730,522 B2* | 5/2014 | Higashiyama | 358/1.9 |
| 9,002,216 B2* | 4/2015 | Matsumoto et al. | 399/15 |
| 2004/0130737 A1* | 7/2004 | Kamimura et al. | 358/1.9 |
| 2004/0136025 A1* | 7/2004 | Moriyama et al. | 358/1.14 |
| 2006/0062441 A1 | 3/2006 | Nishida | |
| 2007/0258102 A1* | 11/2007 | Bielak et al. | 358/1.9 |
| 2008/0123121 A1 | 5/2008 | Sagimori | |
| 2008/0193148 A1* | 8/2008 | Bonino | 399/15 |
| 2009/0296106 A1* | 12/2009 | Donaldson | 358/1.9 |
| 2010/0309493 A1* | 12/2010 | Quach | 358/1.9 |

FOREIGN PATENT DOCUMENTS

| | | |
|---|---|---|
| JP | 2006-166097 A | 6/2006 |
| JP | 2007-020111 A | 1/2007 |
| JP | 2008-134280 A | 6/2008 |

* cited by examiner

FIG.4

| Identification information | Area information | Color measurement results | Preservation period |
|---|---|---|---|
| Color A | Area X | Color A' | Period L |
| Color B | Area Y | Color B' | Period M |
| Color C | Area Z | Color C' | Period N |
| ⋮ | ⋮ | ⋮ | ⋮ |

COLOR PRINTING SYSTEM WITH COLOR ADJUSTMENT UNIT, COLOR PRINTING METHOD WITH COLOR ADJUSTMENT, AND NON-TRANSITORY COMPUTER READABLE RECORDING MEDIUM STORING COLOR PRINTING PROGRAM WITH COLOR ADJUSTMENT

CROSS-REFERENCE TO RELATED APPLICATION

This application is based on Japanese Patent Application No. 2013-062610 filed on Mar. 25, 2013, the contents of which are incorporated herein by reference.

BACKGROUND

1. Technical Field

The present invention relates to a color printing system, a color printing method, and a non-transitory computer readable recording medium stored with a color printing program.

2. Description of Related Arts

A lot of printing systems include color adjustment functions (so-called, calibration functions). Color adjustment is performed in order to absorb output color variations which are generated due to various factors, such as individual difference, environmental change, and long-term aging variation, and in order to secure the uniformity and stability of output results.

Generally, a color adjustment operation performed in the printing system mainly includes the following operations:

(i) Output (print) a test chart which is configured from color patches for color adjustment.

(ii) Perform color measurement on the output results (printed matter) of the test chart using a spectral colorimeter or the like.

(iii) Acquire difference between color measurement results and a target color or concentration which is originally subjected to be output.

(iv) Perform adjustment on subsequent printing in order to absorb the difference.

However, in a system which outputs the test chart according to the related art, the test chart should be printed whenever the color adjustment is executed, and thus paper is excessively consumed. In addition, in the system which outputs the test chart according to the related art, there is a case in which an amount of time that is necessary until original printing is completed takes as long as printing the test chart.

In order to solve such a problem, in recent years, a printing system which can perform color adjustment without outputting a test chart is developed. For example, Japanese Unexamined Publication No. 2005-181673 discloses a system that detects all of colors which are included in a related art test chart from document data corresponding to one page, and performs color adjustment by performing color measurement on the printed results of the colors.

However, when all of the colors which are included in the related-art test chart are not included in document data corresponding to one page, there is a problem in that it is difficult to perform the color adjustment or the accuracy of the color adjustment is lowered.

SUMMARY

The present invention is made to solve the problems, and an object of the present invention is to provide a color printing system, a color printing method, and a non-transitory computer readable recording medium stored with a color printing program, which do not lower accuracy while more effectively performing color adjustment than the related art.

To achieve at least one of the abovementioned objects, a color printing system reflecting one aspect of the present invention includes: a specification unit that specifies an area which has predetermined colors from printing target image data; a printing unit that prints the image data; a color measurement unit that measures the colors of the area, which is specified by the specification unit, with regard to a printed matter which is generated in such a way that the image data is printed by the printing unit; a recording unit that records color measurement results acquired by the color measurement unit whenever the image data is printed; and a color adjustment unit that, when a predetermined number of color measurement results of the predetermined colors are completed, executes color adjustment using the color measurement results.

In addition, the color printing system may further include a setting unit that sets a color adjustment execution timing. Even when the predetermined number of color measurement results of the predetermined colors are not completed at the execution timing which is set by the setting unit, the printing unit prints a test chart which is configured from color patches of colors which are not recorded yet in the recording unit, the color measurement unit performs color measurement on the test chart, and the color adjustment unit executes the color adjustment using the color measurement results of the test chart and the color measurement results which are recorded in the recording unit.

In addition, in the color printing system, the color measurement unit may be a line sensor that can perform the color measurement on entire width of the printed matter.

In addition, in the color printing system, when color measurement results of a same color as the recorded color measurement results are newly acquired by the color measurement unit, the recording unit may overwrite the color measurement results which are recorded in advance with the newly acquired color measurement results.

In addition, in the color printing system, the recording unit may remove the color measurement results that have periods which are overdue based on periods which are set for the respective color measurement results.

In addition, in the color printing system, when the color adjustment is executed by the color adjustment unit, the recording unit may remove all of the recorded color measurement results.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 4 is a diagram illustrating art example of the schematic data configuration of color information data.

DETAILED DESCRIPTION

Figure 1:
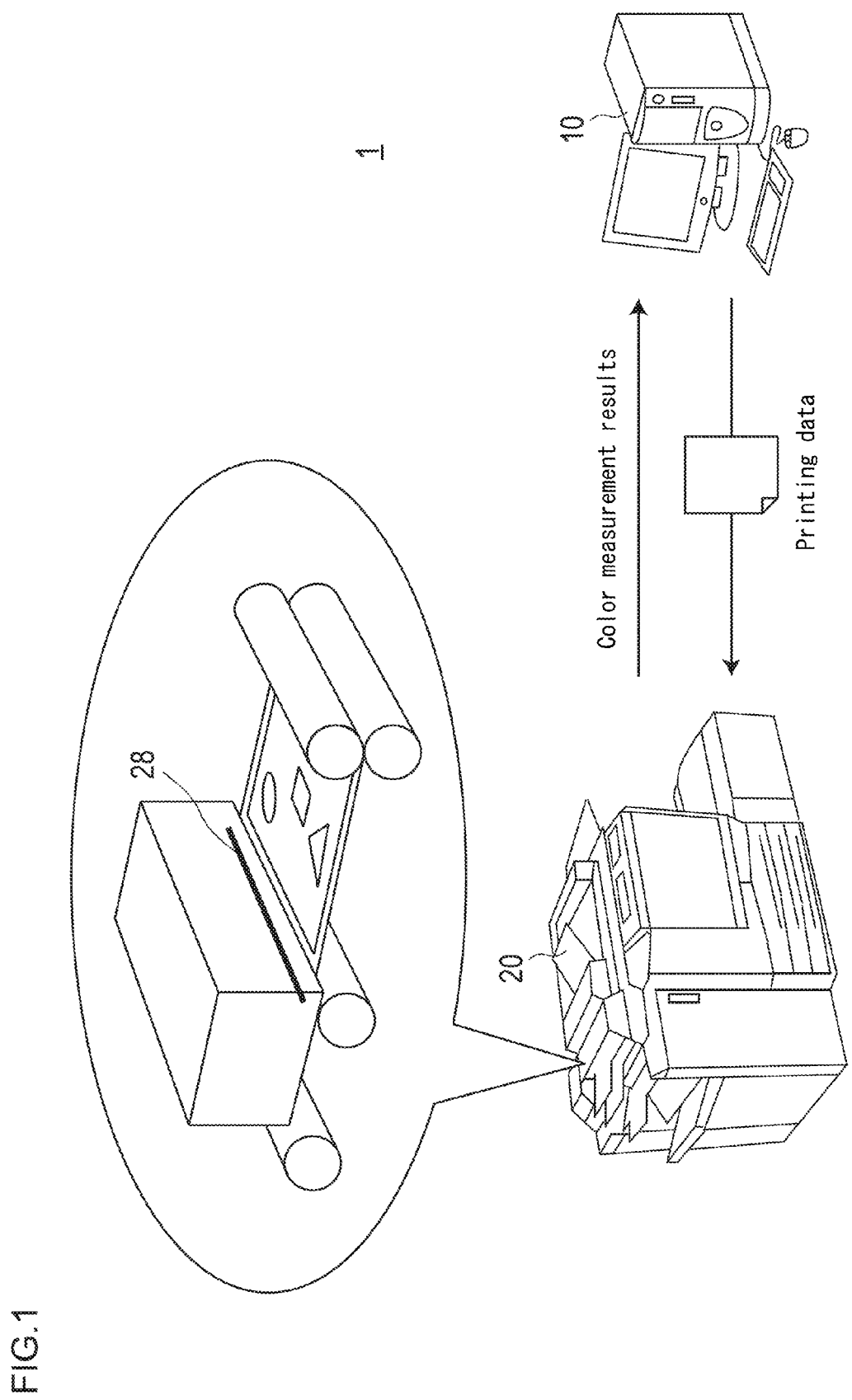
FIG. 1 is a diagram illustrating the schematic configuration of a printing system.

The embodiments of this invention will be described below with reference to the accompanying drawings. Meanwhile, the same reference numerals indicate the same elements in the drawings, and the description thereof will not be repeated. In addition, a ratio of dimensions in the drawings is exaggerated for convenience of explanation and there is a case in which the ratio is different from an actual ratio.

First Embodiment

Printing System 1

Figure 2:
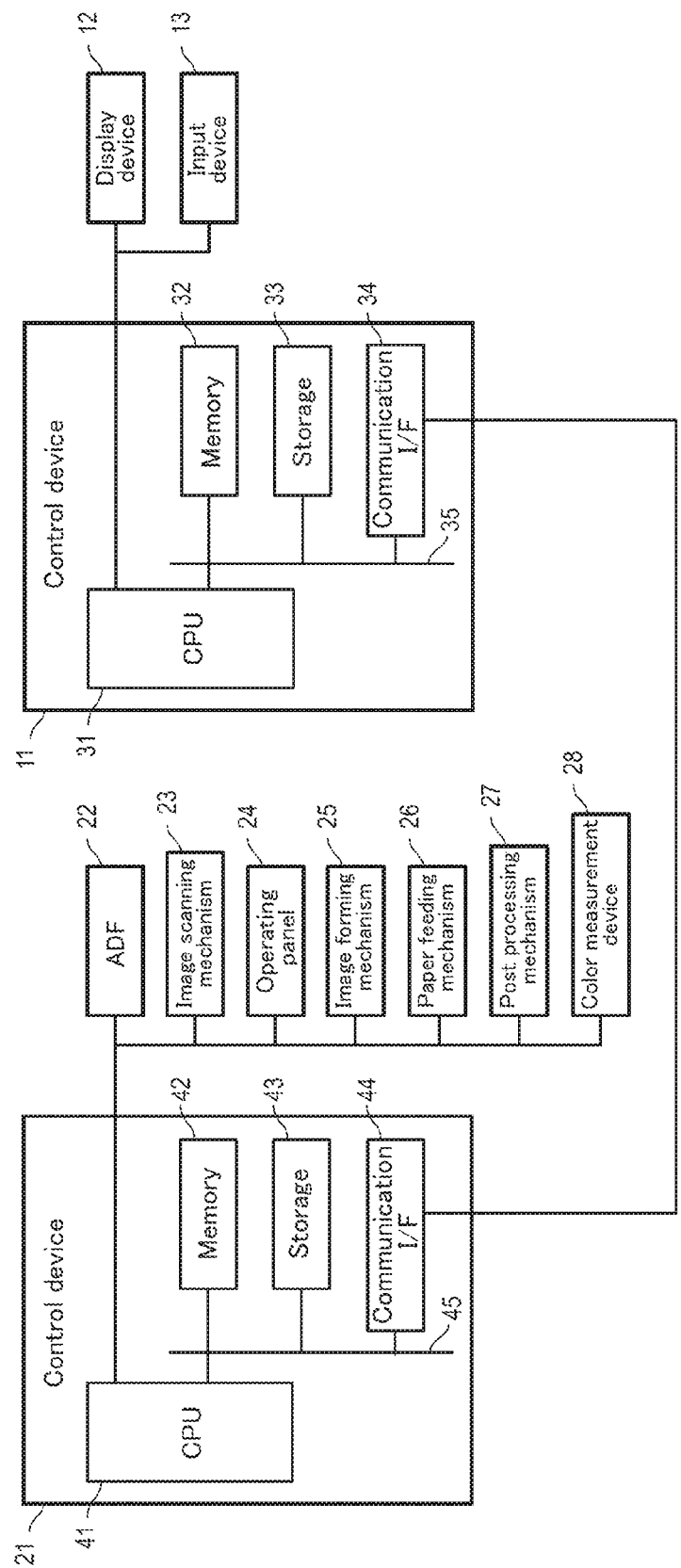
FIG. 2 is a block diagram illustrating an example of the hardware configuration of the printing system.
Figure 3:
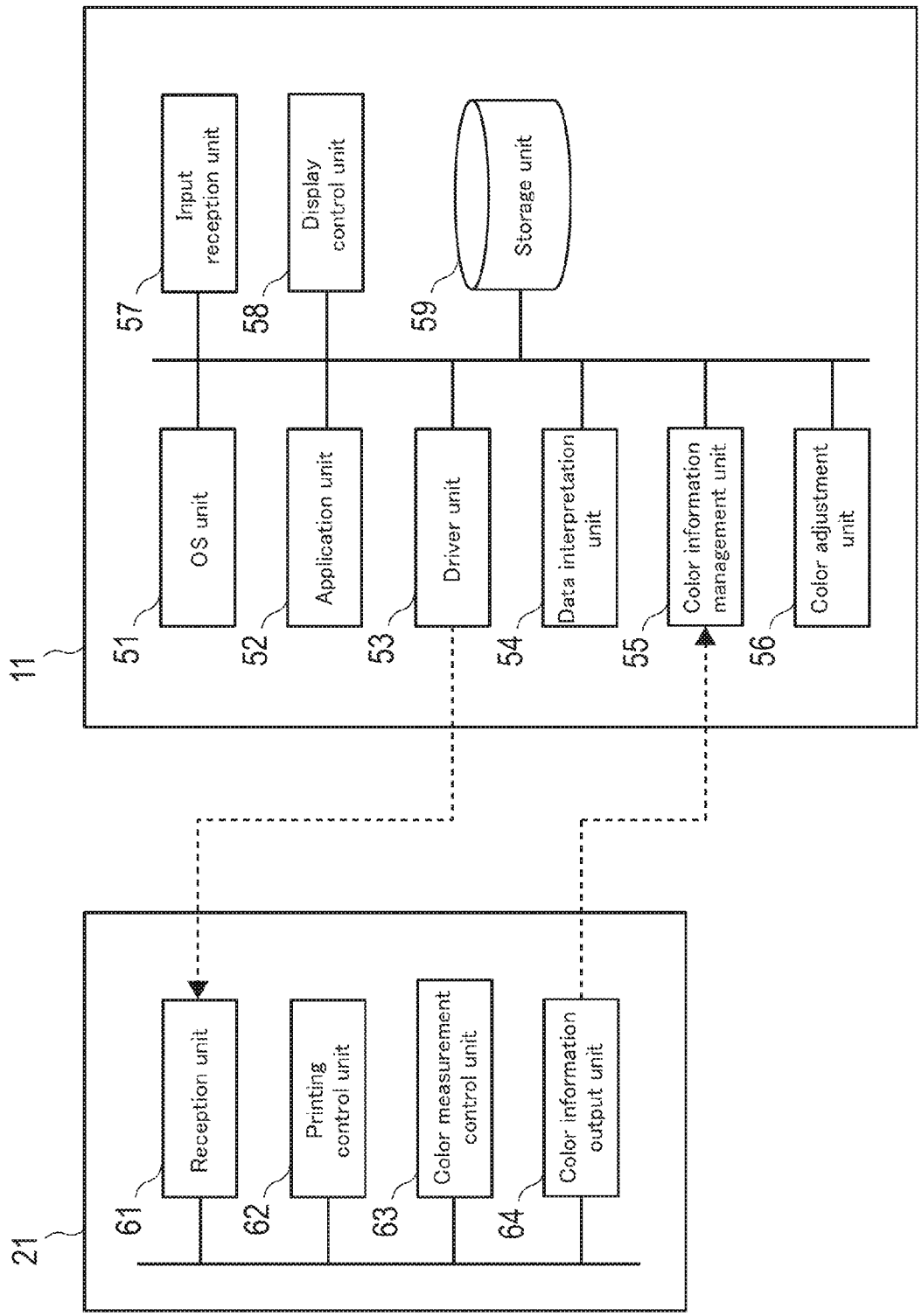
FIG. 3 is a block diagram illustrating an example of the functional configuration of the printing system.

FIG. 1 is a diagram illustrating an example of the schematic configuration of a printing system 1 related to the present embodiment. FIG. 2 is a block diagram illustrating an example of the hardware configuration of the printing system 1. In addition, FIG. 3 is a block diagram illustrating an example of the basic functional configuration of the printing system 1.

Hereinafter, the schematic configuration of the printing system 1 will be described with reference to FIGS. 1 to 3.

As shown in FIG. 1, the printing system 1 includes an information processing apparatus 10 and an image forming apparatus 20.

The information processing apparatus 10 and the image forming apparatus 20 are connected for intercommunication via a computer network (hereinafter, simply referred to as "network"). The network is configured from a Local Area Network (LAN) which connects computers and network apparatuses in conformity with a standard, such as the Ethernet (registered trademark), a token ring, or a Fiber Distributed Data Interface (FDDI), a Wide Area Network (WAN) which connects LANs through dedicated lines, and the like.

In addition, the information processing apparatus 10 may be connected to the image forming apparatus 20 through, for example, a bus for a dedicated interface such as an IEEE1394 serial bus or a Universal Serial Bus (USB). In addition, the information processing apparatus 10 may be integrated with the image forming apparatus 20 by storing the information processing apparatus 10 in the housing of the image forming apparatus 20.

Meanwhile, the type and the number of apparatuses which are connected to the network are not limited to the example shown in FIG. 1.

Information Processing Apparatus 10

The information processing apparatus 10 is an apparatus which functions as the controller of the image forming apparatus 20, and is a general computer apparatus. For example, a desktop-type Personal Computer (PC) as shown in FIG. 1 and a mobile terminal, such as a tablet terminal, a smart phone, or a mobile phone may be used as the information processing apparatus 10.

The information processing apparatus 10 converts document data which is created in the apparatus itself (or which is transmitted from an external apparatus that is not shown in the drawing) into printing data in the form which can be interpreted in the image forming apparatus 20, and transmits the printing data to the image forming apparatus 20. Meanwhile, the document data includes paper data, image data, and the like. In addition, the printing data includes Page Description Language (PDL) data which is described using a page description language.

In addition, the information processing apparatus 10 includes a color adjustment function (so-called calibration function) and is capable of correcting the output of the image forming apparatus 20. The color adjustment function includes adjustment related to concentration property conversion, adjustment related to color space conversion, and the like.

The information processing apparatus 10 as described above includes a control device 11, a display device 12, and an input device 13 as shown in FIG. 2.

The control device 11 controls the whole information processing apparatus 10. For example, the control device 11 includes a Central Processing Unit (CPU) 31, a memory 32, a storage 33, and a communication interface (I/F) 34, and the units are connected to each other via a bus 35 in order to exchange signals.

The CPU 31 is a control circuit which is configured from a multi-core processor or the like which performs control on each of the above units or performs various operational processes in accordance with a program, and each of the functions of the information processing apparatus 10 is realized in such a way that the CPU 31 executes a program corresponding to each function.

The memory 32 is a main memory device which temporarily stores a program or data as a work area and which can be accessed at high speed. For example, a Dynamic Random Access Memory (DRAM), a Synchronous Dynamic Random Access Memory (SDRAM), a Static Random Access Memory (SRAM), or the like is used as the memory 32.

The storage 33 is a high-capacity auxiliary storage device which stores various types of programs, including an operating system, and various types of data. For example, a flash memory, a solid-state drive, a hard disk, a Read Only Memory (ROM), or the like is used as the storage 33.

The communication I/F 34 is an interface to communicate with the external device (for example, the image forming apparatus 20) via the network, and a standard, such as the Ethernet (registered trademark), a token ring, FDDI, and Wireless Fidelity (Wi-Fi), is used. In addition, an interface used to perform Bluetooth, infrared communication, and USB communication may be provided.

The display device 12 displays various types of setting screens related to printing which is performed in the image forming apparatus 20 (for example, a setting screen related to a color adjustment function). For example, a liquid crystal display, an organic Electro-Luminescence (EL), or the like is used as the display device 12.

The input device 13 receives various types of inputs from a user. For example, a keyboard, a mouse, and the like are used as the input device 13.

As shown in FIG. 3, the control device 11 of the information processing apparatus 10 which is configured from the above-described hardware configuration includes an Operating System (OS) unit 51, an application unit 52, a driver unit 53, a data interpretation unit 54, a color information management unit 55, a color adjustment unit 56, an input reception unit 57, a display control unit 58, and a storage unit 59 as a functional configuration.

For example, the OS unit 51 is so-called basic software of a computer which manages the system of the information processing apparatus 10 and provides a basic user operating environment.

The application unit 52 operates according to a general document creation program which is installed in the information processing apparatus 10. The document creation program includes, for example, Word, Excel, PowerPoint, and the like, and can create printing target document data (including a document file, an image file, and the like).

The driver unit 53 is software which causes the information processing apparatus 10 to function as the controller of the image forming apparatus 20. More specifically, the driver unit 53 reads a printing target document data, converts the printing target document data into printing data which can be interpreted by the image forming apparatus 20 (for example, PDL data), and transmits the printing data to the image forming apparatus 20 as a printing job. The printing job includes basic setting information related to the number of copies, a paper size, single-sided or dual-sided printing and monochrome or color printing, and area information related to an area which has a predetermined color in the document data, in addition to the printing data which is the printing target. Meanwhile, the "predetermined color" indicates, for example, a color of each color patch which is included in a general test chart, and is not limited to one color.

The data interpretation unit 54 interprets the printing target document data, and specifies an area which has a predetermined color in the document data (hereinafter, referred to as "color measurement area").

The color information management unit 55 manages information related to the predetermined color. For example, when the document data is printed in the image forming apparatus 20 and color measurement is executed on the color measurement area, the color information management unit 55 records the color measurement results in a color information table 150. In addition, the color information management unit 55 performs removing, overwriting or the like on the color measurement results which are recorded in the color information table 150. The detailed data structure of the color information table 150 will be described later.

The color adjustment unit 56 includes the above-described color adjustment function. For example, when a predetermined number of color measurement results (for example, 80% of the number of color patches which are included in a general test chart) are completed for a predetermined color, the color adjustment unit 56 executes the color adjustment using the color measurement results. The color adjustment which is executed by the color adjustment unit 56 includes adjustment related to conversion performed on the concentration property, adjustment related to conversion performed on a color space, and the like.

The input reception unit 57 receives input from the user. For example, the input reception unit 57 determines content of an operation performed by the user on the input device 13, such as the keyboard or the mouse, and specifies an instruction requiring when printing starts, an instruction related to printing setting, and the like.

The display control unit 58 controls the display device 12, and displays a screen which is necessary for various operations in the information processing apparatus 10. For example, the display control unit 58 displays various types of setting screens related to printing which is performed in the image forming apparatus 20 on the display device 12.

The storage unit 59 stores various types of information used in the printing system 1. For example, the storage unit 59 stores at least the color information table 150.

FIG. 4 is a diagram illustrating an example of the schematic data configuration of the color information table 150.

As shown in FIG. 4, the color information table 150 is associated with identification information 151, area information 152, color measurement result 153, and a preservation period 154.

The identification information 151 is information used to identify a predetermined color which is specified based on the document data, and is, for example, a color value which indicates a color of each color patch included in a general test chart. For example, a Lab value, an RGB value, a CMYK value, or the like is used as the color value.

The area information 152 is information which indicates the position of an area (color measurement area) having the predetermined color which is specified based on the document data. For example, the area information may be information indicative of a range of 2-dimensional coordinates, and may be information in the form of coordinate≤K2, K3≤Y coordinate≤K4.

The color measurement result 153 is information which indicates a color measurement result related to the region for the color measurement of the document data which is printed in the image forming apparatus 20, and is so-called a color measurement value. For example, a color value, such as the Lab value, is used as the color measurement value.

The preservation period 154 is information which indicates a period during which the color measurement result 153 recorded in the color information table 150 is preserved, and is information which indicates lapse of time (year, month, date, time, minute, second, and the like) from, for example, a date and time that the color measurement result 153 is recorded. In addition, the preservation period 154 may be information which indicates a date and time that the color measurement result 153 is removed.

The OS unit 51, the application unit 52, the driver unit 53, the data interpretation unit 54, the color information management unit 55, the color adjustment unit 56, the input reception unit 57, and the display control unit 58 as described above are realized in such a way that the CPU 31 reads out a program installed in the storage 33 in the memory 32 and executes the program. In addition, the storage unit 59 is realized by the storage 33 or the memory 32.

Image Forming Apparatus 20

The image forming apparatus 20 includes at least a printing function, and is used to print the printing data which is included in a printing job transmitted from the information processing apparatus 10. In the embodiment, the image forming apparatus 20 is a Multi-Function Peripheral (MFP) which includes at least one of a copy function, a scan function, and a facsimile function, and the like in addition to the printing function.

In addition, the image forming apparatus 20 can perform partial color measurement on a printing result, and is capable of transmitting the color measurement result to the information processing apparatus 10 if necessary.

As shown in FIG. 2, the image forming apparatus 20 as described above includes a control device 21, an Auto Document Feeder (ADF) 22, an image scanning mechanism 23, an operating panel 24, an image forming mechanism 25, a paper feeding mechanism 26, a post processing mechanism 27, and a color measurement device 28.

The control device 21 controls the whole image forming apparatus 20. For example, the control device 21 includes a CPU 41, a memory 42, a storage 43, and a communication interface (I/F) 44 as shown in FIG. 2, and these units are connected to each other via a bus 45 used to exchange signals.

The CPU 41 is a control circuit which is configured from a multi-core processor or the like that performs control on each of the units in accordance with the program and executes various operational processes. Each function of the image forming apparatus 20 is realized in such a way that the CPU 41 executes a program corresponding to each function.

The memory 42 is a main memory device which temporarily stores programs and data as a work area and which can be accessed at high speed. For example, a DRAM, an SDRAM, an SRAM, or the like is used as the memory 42.

The storage 43 is a high-capacity auxiliary storage device which stores various types of programs, including firmware, and various types of data. For example, a flash memory, a ROM, a solid-state drive, a hard disk, or the like is used as the storage 43.

The communication I/F 44 is an interface to communicate with the external device (for example, the information processing apparatus 10) via the network, and a standard, such as the Ethernet (registered trademark), a token ring, FDDI, and Wi-Fi is used. In addition, an interface used to perform Bluetooth, infrared communication, and USB communication may be provided.

The ADF 22 includes a paper feeding motor (not shown in the drawing) or the like, and transports a document paper which is placed on a document tray to a predetermined scanning position of the image scanning mechanism 23.

The image scanning mechanism 23 includes a light source (not shown in the drawing), an image sensor (not shown in the drawing) and the like, optically reads the document paper which is transported by the ADF 22 or the document paper which is placed on the document tray, and forms an image (hereinafter, referred to as "scanning data").

The operating panel 24 includes, for example, a touch panel, and is configured to display a printing job progress status and an error generation status and to enable various operations (inputs).

The image forming mechanism 25 includes a photosensitive drum, an electrically charging device, an exposure apparatus, a development device, an intermediate transfer belt, a cleaning device, and a fixing device which are not shown in the drawing, and functions as a general electrographic printing engine. That is, the image forming mechanism 25 forms a latent image, which corresponds to the printing data or the scanning data transmitted from the information processing apparatus 10, on the photosensitive drum, electrostatically attaches toners which are colored particles to the latent image (visible), and transfers and fixes the latent image on the printing medium, thereby acquiring printed matter. However, the image forming mechanism 25 may use an ink jet method or a thermal transferring method in addition to the electrographic method.

The paper feeding mechanism 26 includes a paper feeding tray used to contain a printing medium, a paper feeding motor (not shown in the drawing), and the like, and transports the printing medium in the paper feeding tray to the image forming mechanism 25.

The post processing mechanism 27 adds a finishing process, such as punching, stapling, or binding, to the printed matter which is transported from the image forming mechanism 25, and discharges the printed matter to a designated discharge area.

The color measurement device 28 performs color measurement on a printed result (printed matter) about the printing data which is transmitted from the information processing apparatus 10, and supplies the color measurement result to the information processing apparatus 10. For example, the color measurement device 28 performs color measurement using an inline sensor which is arranged in the middle of a transport path through which the printed matter is transported from the image forming mechanism 25 to the post processing mechanism 27. Meanwhile, the inline sensor can perform the color measurement on the whole width of the printed matter. In addition, the color measurement is performed in such a way that light is emitted from the light source (lamp) and is evenly radiated on the printed matter, and the reflected light thereof forms an image on a light reception device through a light reception lens.

As shown in FIG. 3, the control device 21 of the image forming apparatus 20 which is configured from the above-described hardware configuration includes a reception unit 61, a printing control unit 62, a color measurement control unit 63, and a color information output unit 64 as functional configurations.

For example, the reception unit 61 receives a printing job which is transmitted from the information processing apparatus 10 via the network.

The printing control unit 62 controls printing. More specifically, the printing control unit 62 controls the image forming mechanism 25, the paper feeding mechanism 26, the post processing mechanism 27 and the like, and prints the printing data which is included in the printing job received by the reception unit 61.

The color measurement control unit 63 controls color measurement. More specifically, the color measurement control unit 63 controls the color measurement device 28 or the like, and performs partial color measurement on the printed result acquired by the image forming mechanism 25 (color measurement of a color measurement area which is specified based on area information 152).

The color information output unit 64 transmits the color measurement result (color value) acquired by the color measurement control unit 63 to the information processing apparatus 10 via the network.

The printing control unit 62 and the color measurement control unit 63 as described above are realized in such a way that the CPU 41 reads out a program, which is installed in the storage 43, in the memory 42 and executes the program. In addition, the reception unit 61 and the color information output unit 64 are realized in such a way that the CPU 41 reads out a program, which is installed in the storage 43, in the memory 42, executes the program, and controls the communication I/F 44.

Subsequently, the characteristic operation of the printing system 1 will be described.

Figure 5:
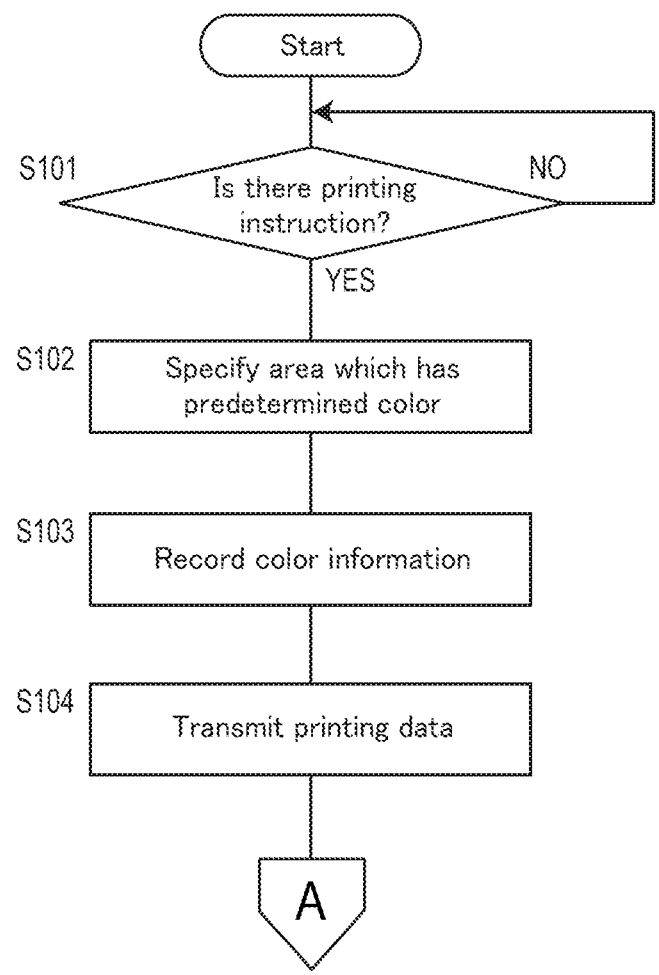
FIG. 5 is a flowchart illustrating the sequence of a printing instruction process.
Figure 6:
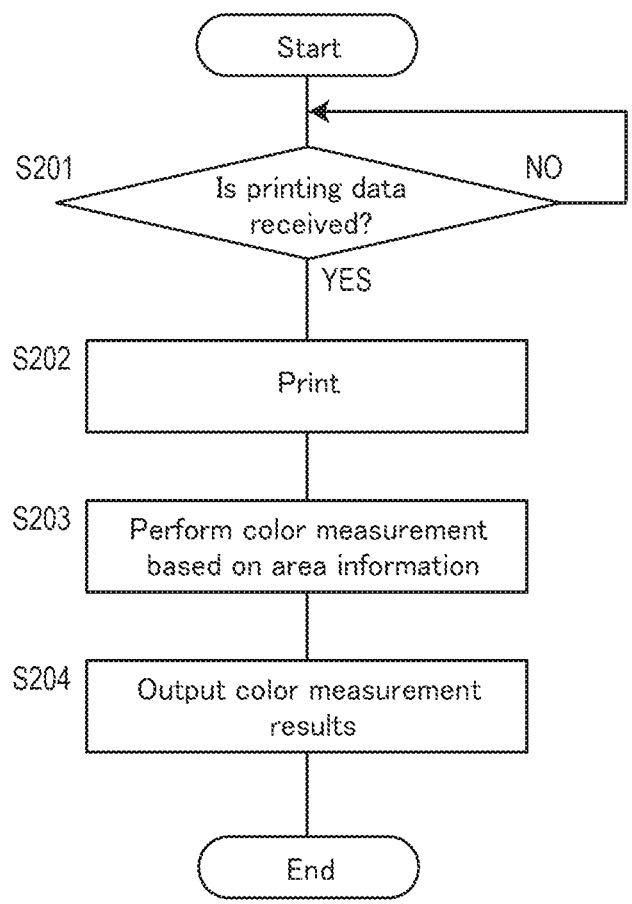
FIG. 6 is a flowchart illustrating the sequence of a printing process.
Figure 7:
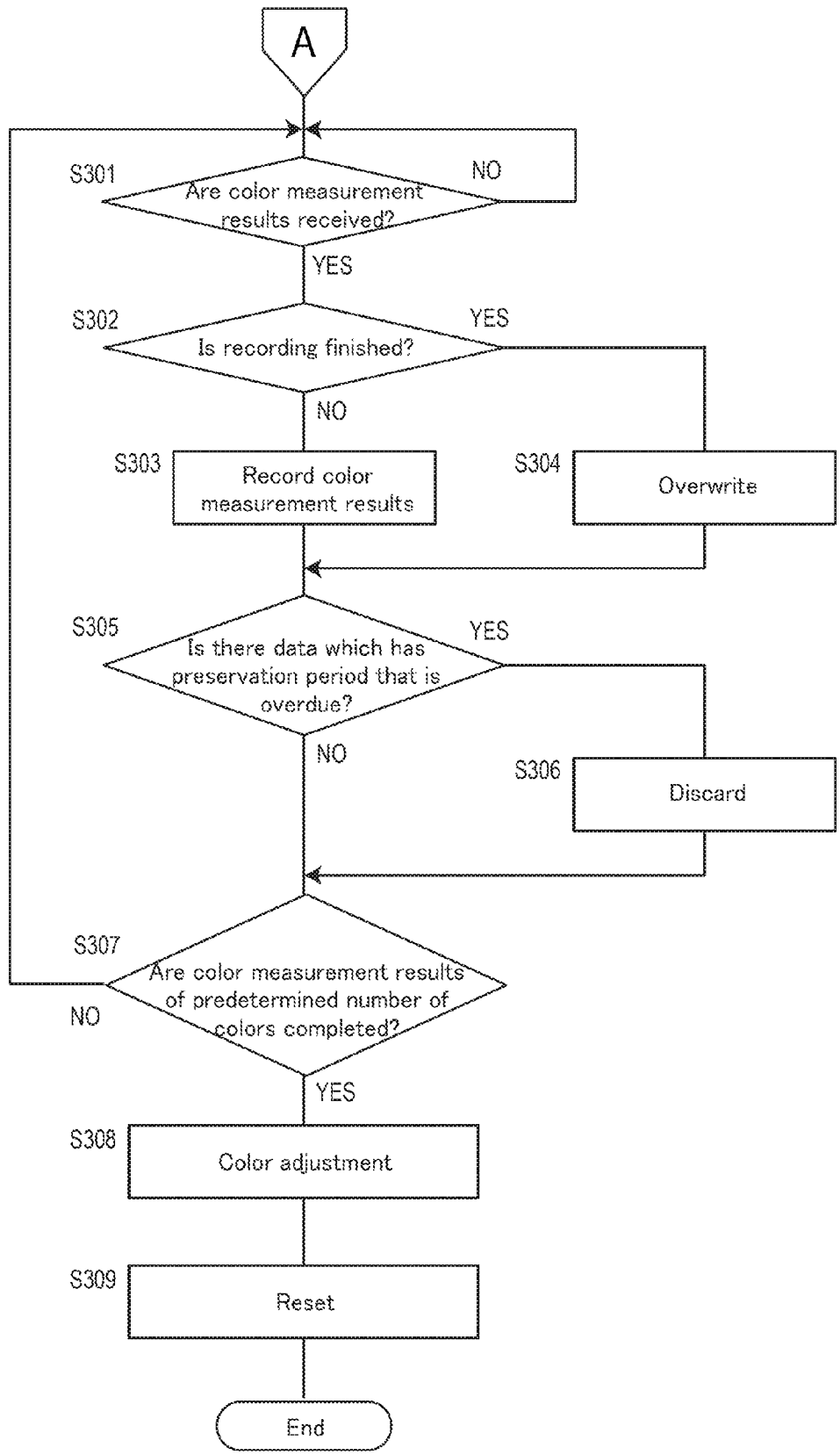
FIG. 7 is a flowchart illustrating the sequence of a color adjustment process according to a first embodiment.

FIG. 5 is a flowchart illustrating the sequence of a printing instruction process which is executed in the information processing apparatus 10. FIG. 6 is a flowchart illustrating the sequence of a printing process which is executed in the image forming apparatus 20. FIG. 7 is a flowchart illustrating the sequence of a color adjustment process which is executed in the information processing apparatus 10. Meanwhile, the printing instruction process is a process in which the information processing apparatus 10 instructs the image forming apparatus 20 to perform printing. In addition, the printing process is a process in which the image forming apparatus 20 performs printing based on an instruction from the information processing apparatus 10. In addition, the color adjustment process is a process to adjust the hues of the printed result acquired by the image forming apparatus 20.

Hereinafter, the sequences of the printing instruction process, the printing process, and the color adjustment process will be described with reference to FIGS. 5 to 7.

Printing Instruction Process

First, the printing instruction process (FIG. 5) will be described.

For example, when document data is created by the application unit 52 and the information processing apparatus 10 receives an instruction to start printing the document data, the information processing apparatus 10 starts the printing instruction process shown in FIG. 5. Here, for example, the instruction to start printing is performed in such a way that a user operates the input device 13.

When the printing instruction process starts, the information processing apparatus 10 functions as the display control unit 58, and displays a predetermined printing setting screen on the display device 12. When the printing setting screen is being displayed on the display device 12, the information processing apparatus 10 also functions as the input reception unit 57 and receives an instruction related to printing setting from the user.

At this time, the information processing apparatus 10 determines whether or not an instruction to perform printing is provided in addition to the instruction related to the printing setting (step S101). For example, when an operation to press a print button which is provided on the printing setting screen is performed, the information processing apparatus 10 determines that an instruction to perform printing is provided. When the instruction to perform printing is not provided (step S101: No), the information processing apparatus 10 waits until the instruction to perform printing is provided.

When the instruction to perform printing is provided (step S101: Yes), the information processing apparatus 10 functions as the data interpretation unit 54, analyzes printing target document data, and specifies an area which includes a predetermined color in the document data (color measurement area) (step S102). As a method of specifying the color measurement area, a color corresponding to a predetermined color (for example, a color of each color patch included in a general test chart) may be detected from, for example, among information (RGB values and the like) which indicates the colors of elements (text, ruled lines, and the like) included in the document data, and the position of an element (coordinates on a page) which has the predetermined color may be specified as the color measurement area. In addition, when an element included in the document data is image data, a color corresponding to a predetermined color is detected from among information (RGB values, and the like) which indicates the color of a pixel that configures the image data, and the position of the pixel (coordinates on a page) which has the predetermined color may be specified as the color measurement area. However, when the same colored pixels are present in continuous positions, the positions are treated as the same color measurement area.

Subsequently, the information processing apparatus 10 functions as the color information management unit 55, and records color information for the color measurement area which is specified in the printing target document data (step S103). More specifically, with regard to the color measurement area which is specified in step S102, the information processing apparatus 10 associates the identification information 151 which is used to identify a color included in the color measurement area with the area information 152 which indicates a position in a page of the color measurement area, and records the result of association in the color information table 150 (FIG. 4). Meanwhile, for example, a color value, such as the Lab value, is used for the identification information 151. Further, for example, 2-dimensional coordinate values are used for the area information 152.

Further, the information processing apparatus 10 functions as the driver unit 53, reads the printing target document data, converts the printing target document data into printing data (for example, PDL data) which can be interpreted by the image forming apparatus 20, and transmits the printing data acquired through the conversion to the image forming apparatus 20 as a printing job (step S104). The printing job includes the printing setting information, the identification information 151, the area information 152, and the like in addition to the printing data. Meanwhile, the printing setting information includes various types of setting information, such as a paper size, a paper type, a layout, and the number of sheets, which are necessary for printing.

Thereafter, the information processing apparatus 10 ends the printing instruction process and the process proceeds to the color adjustment process shown in FIG. 7. When the above-described printing instruction process is executed in the information processing apparatus 10, it is possible to instruct the image forming apparatus 20 to print the document data and it is possible to notify the image forming apparatus 20 of the position of the predetermined color included in the document data.

Printing Process

Subsequently, the printing process (FIG. 6) in which the printing job transmitted through the printing instruction process is printed on the side of the image forming apparatus 20 will be described.

For example, when power is supplied, the image forming apparatus 20 starts the printing process.

When the printing process starts, the image forming apparatus 20 functions as the reception unit 61 and determines whether or not a printing job transmitted from the information processing apparatus 10 is received (step S201). When the printing job is not received (step S201: No), the image forming apparatus 20 waits until the printing job is received.

When the printing job is received (step S201: Yes), the image forming apparatus 20 functions as the printing control unit 62 and performs printing based on the received printing job (step S202). More specifically, the image forming apparatus 20 extracts the printing data, the printing setting information, the identification information 151, and the area information 152 from the received printing job. Further, the image forming apparatus 20 converts the printing data into raster data (image data) based on the printing setting information, and prints the raster data by controlling the image forming mechanism 25, the paper feeding mechanism 26, and the like.

Thereafter, the image forming apparatus 20 functions as the color measurement control unit 63, and performs color measurement on a printed result, that is, printed matter which is generated by the image forming mechanism 25 (step S203). More specifically, the image forming apparatus 20 specifies an area, on which the color measurement should be performed, in the printed result (printed matter) with reference to the area information 152 which is received in step S201. Further, while the printed result (printed matter) is being transported from the image forming mechanism 25 to the post processing mechanism 27, the image forming apparatus 20 performs color measurement on the area, specified as an area on which the color measurement should be performed, by controlling the color measurement device 28 such as the inline sensor.

It is possible to acquire a color value (a color measurement value such as a Lab value) when the color measurement area which has the predetermined color is actually printed by performing the color measurement in step S203.

Subsequently, the image forming apparatus 20 functions as the color information output unit 64, and transmits a color measurement result for each color measurement area acquired in step S203 to the information processing apparatus 10, together with the corresponding identification information 151 (step S204).

Thereafter, the image forming apparatus 20 ends the printing process.

When the above-described printing process is executed in the image forming apparatus 20, it is possible to print the printing data transmitted from the information processing apparatus 10 and it is possible to measure a color when the color measurement area (area which includes the predetermined color) included in the document data which is the original data for printing is printed.

Color Adjustment Process

First Embodiment

Subsequently, the color adjustment process (FIG. 7) which is performed in the information processing apparatus 10 subsequent to the printing instruction process (FIG. 5) will be described.

When the color adjustment process starts after the printing instruction process ends, the information processing apparatus 10 functions as the color information management unit 55, and determines whether or not the color measurement result transmitted from the image forming apparatus 20 is received (step S301). When the color measurement result is not received (step S301: No), the information processing apparatus 10 waits until the color measurement result is received.

When the color measurement result is received (step S301: Yes), the information processing apparatus 10 functions as the color information management unit 55 and determines whether or not the received color measurement result is the color measurement result of a color which is recorded in advance (step S302). More specifically, the information processing apparatus 10 determines whether or not the color measurement result 153, which is associated with the identification information 151 received together with the color measurement result, is present in the color information table 150 in advance.

When the color measurement result 153 is not present in the color information table 150, the information processing apparatus 10 determines that the received color measurement result is the color measurement result of a color which is not recorded yet (step S302: No). Further, the information processing apparatus 10 associates the received color measurement result with the identification information 151 which is received together with the color measurement result, and records (adds) the result to the color information table 150 as the color measurement result 153 (step S303). At this time, the information processing apparatus 10 records the preservation period 154 which is associated with the recorded color measurement result 153. The preservation period 154 can be set to, for example, one day after a date and time that the color measurement result 153 is recorded, one week, one month, and the like in accordance with usage state.

On the other hand, when the received identification information 151 is present in the color information table 150, the information processing apparatus 10 determines that the received color measurement result is the color measurement result of a color which is recorded in advance (step S302: Yes). Further, the information processing apparatus 10 overwrites the color measurement result 153, which is associated with the identification information 151 received together with the color measurement result, based on the received latest color measurement result (step S304). At this time, the information processing apparatus 10 also updates the preservation period 154 which is associated with the overwritten color measurement result 153. For example, it is possible to update the preservation period 154 as one day after a date and time that the color measurement result 153 is overwritten, one week, one month, and the like. In addition, the preservation period 154 may not be updated.

When the process in step S303 or step S304 ends, the information processing apparatus 10 sequentially functions as the color information management unit 55, and determines whether or not data (record), the preservation period of which is overdue, is present in the color information table 150 (step S305). More specifically, the information processing apparatus 10 acquires a current time that is internally held by the OS unit 51 or a current time that is held by an external server, and determines whether or not the preservation period 154 which shows a date and time that are previous to the current time is present in the color information table 150.

If the preservation period 154 which indicates a date and time previous to a current time is present, the information processing apparatus 10 assumes that the preservation period is overdue data (step S305: Yes), and removes (discards) the entire record which includes the corresponding preservation period 154 (step S306). Thereafter, the process proceeds to step S307.

On the other hand, if the preservation period 154 which indicates a date and time previous to a current time is not present, the information processing apparatus 10 assumes that there is no data which has an overdue preservation period (step S305: No), and the process proceeds to step S307 directly.

Subsequently, the information processing apparatus 10 functions as the color adjustment unit 56, and determines whether or not a predetermined number of color measurement results of the predetermined color are completed (step S307). For example, the information processing apparatus 10 determines whether or not a predetermined number or more of color measurement results 153 are present in the color information table 150 for a color of each of the color patches which are included in a general test chart. Meanwhile, the predetermined number is, for example, the number corresponding to a predetermined ratio (for example, 80%) of all the color patches which are included in the general test chart.

Further, if a predetermined number of color measurement results are not completed for the predetermined color (step S307: No), the information processing apparatus 10 returns the process to step S301 and waits for a new color measurement result.

On the other hand, if the predetermined number of color measurement results are completed for the predetermined color (step S307: Yes), the information processing apparatus 10 subsequently functions as the color adjustment unit 56, and executes color adjustment using the color measurement results 153 stored in the color information table 150 (step S308).

For example, in step S308, the information processing apparatus 10 performs at least either one of adjustment related to the conversion of concentration characteristics or adjustment related to the conversion of a color space.

In the adjustment related to the conversion of concentration characteristics, the information processing apparatus 10 modifies a concentration conversion table such that "the color of the identification information 151" and "the color of the color measurement result 153" which are stored in the same record of the color information table 150 are identical with each other. Meanwhile, the concentration conversion table indicates a table which is used to perform conversion on the concentration characteristics.

In addition, in the adjustment related to the conversion of the color space, the information processing apparatus 10 modifies a color profile such that the color of the identification information 151 and the color of the color measurement result 153 which are stored in the same record of the color information table 150 are identical with each other. Meanwhile, the color profile indicates a table which is used to perform conversion on the color space.

When the color adjustment ends, the information processing apparatus 10 functions as the color information management unit 55, and resets the accumulation of the color measurement results (step S309). More specifically, the information processing apparatus 10 removes the color information table 150 from the storage unit 59.

Thereafter, the information processing apparatus 10 ends the color adjustment process.

When the above-described color adjustment process is executed in the information processing apparatus 10, the color measurement result of an area which includes the predetermined color is recorded whenever the document data for printing is printed, and thus it is possible to execute the color adjustment at a time point in which a predetermined number of color measurement results are completed. Therefore, even when the test chart is not printed, it is possible to execute color adjustment by only printing a plurality of pieces of document data. In addition, since the color adjustment is not executed until a predetermined number of color measurement results are acquired, the accuracy of the color adjustment is guaranteed.

Second Embodiment

Subsequently, a second embodiment of the present invention will be described. Hereinafter, description which is common to the first embodiment is not repeated, and description is made centering on differences.

The second embodiment is different from the first embodiment in that a user can arbitrarily set color adjustment intervals. More specifically, in the second embodiment, an adjustment setting process to set the color adjustment intervals is performed in the information processing apparatus 10.

Color Adjustment Setting Process

Figure 8:
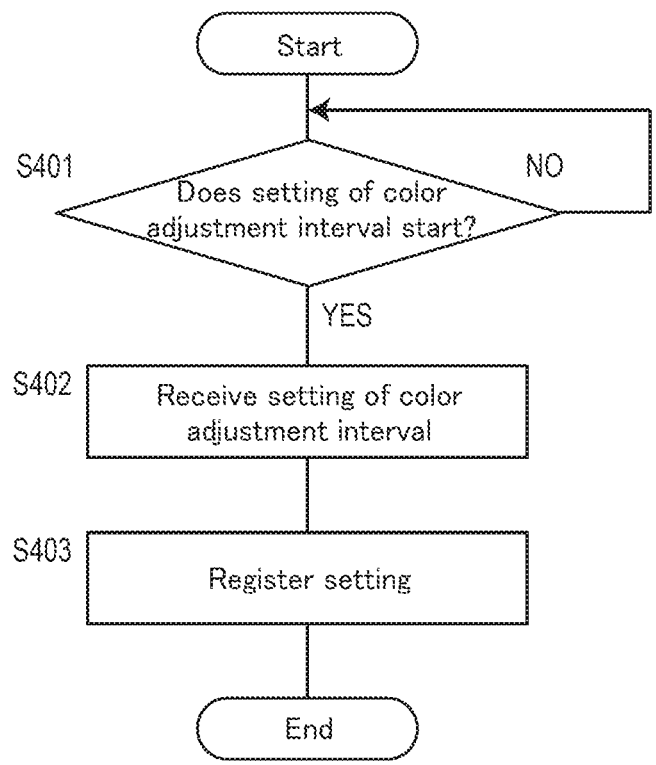
FIG. 8 is a flowchart illustrating the sequence of a color adjustment setting process.

FIG. 8 is a flowchart illustrating the sequence of the color adjustment setting process.

For example, when power is supplied, the information processing apparatus 10 starts the color adjustment setting process.

When the color adjustment setting process is started, the information processing apparatus 10 functions as the input reception unit 57 and determines whether or not an instruction to start setting of the color adjustment intervals is provided from a user (step S401). More specifically, the information processing apparatus 10 detects whether or not an operation to display a GUI (hereinafter, referred to as "color adjustment wizard screen") which is necessary to set the color adjustment intervals is performed.

When an operation to display the color adjustment wizard screen is not detected (step S401: No), the information processing apparatus 10 waits until the operation is detected.

When the operation to display the color adjustment wizard screen is detected, the information processing apparatus 10 determines that an instruction to start the setting of the color adjustment intervals is provided (step S401: Yes), functions as the display control unit 58, and displays the color adjustment wizard screen on the display device 12.

When the color adjustment wizard screen is being displayed on the display device 12, the information processing apparatus 10 functions as the input reception unit 57 and receives an instruction to set the color adjustment intervals from the user (step S402). For example, the information processing apparatus 10 receives input of a numerical value which designates the color adjustment intervals in a predetermined field provided in the color adjustment wizard screen. The color adjustment intervals may be designated by, for example, a time interval (one day, one week, one month, and the like), and may be designated by the number of prints (10 sheets, 50 sheets, 100 sheets, and the like).

Further, the information processing apparatus 10 subsequently functions as the input reception unit 57. When the information processing apparatus 10 receives an instruction to register the setting of the color adjustment intervals, the information processing apparatus 10 stores the setting of the color adjustment intervals, which is received in step S402 (step S403). For example, the instruction to register the setting of the color adjustment intervals is provided in such a way that a set-up registration button which is provided on the color adjustment wizard screen is operated.

Thereafter, the information processing apparatus 10 ends the color adjustment setting process.

When the above-described color adjustment setting process is executed in the information processing apparatus 10, it is possible for the user to arbitrarily set the color adjustment intervals.

Even in the second embodiment in which the color adjustment intervals are set by the user, the printing system 1 executes the printing instruction process, the printing process, and the color adjustment process.

However, since the printing instruction process and the printing process according to the second embodiment are the same processes as in the first embodiment (FIGS. 5 and 6), the description thereof will not be repeated.

Hereinafter, the sequence of only a color adjustment process according to the second embodiment which is different from the first embodiment will be described.

Color Adjustment Process

Second Embodiment

Figure 9:
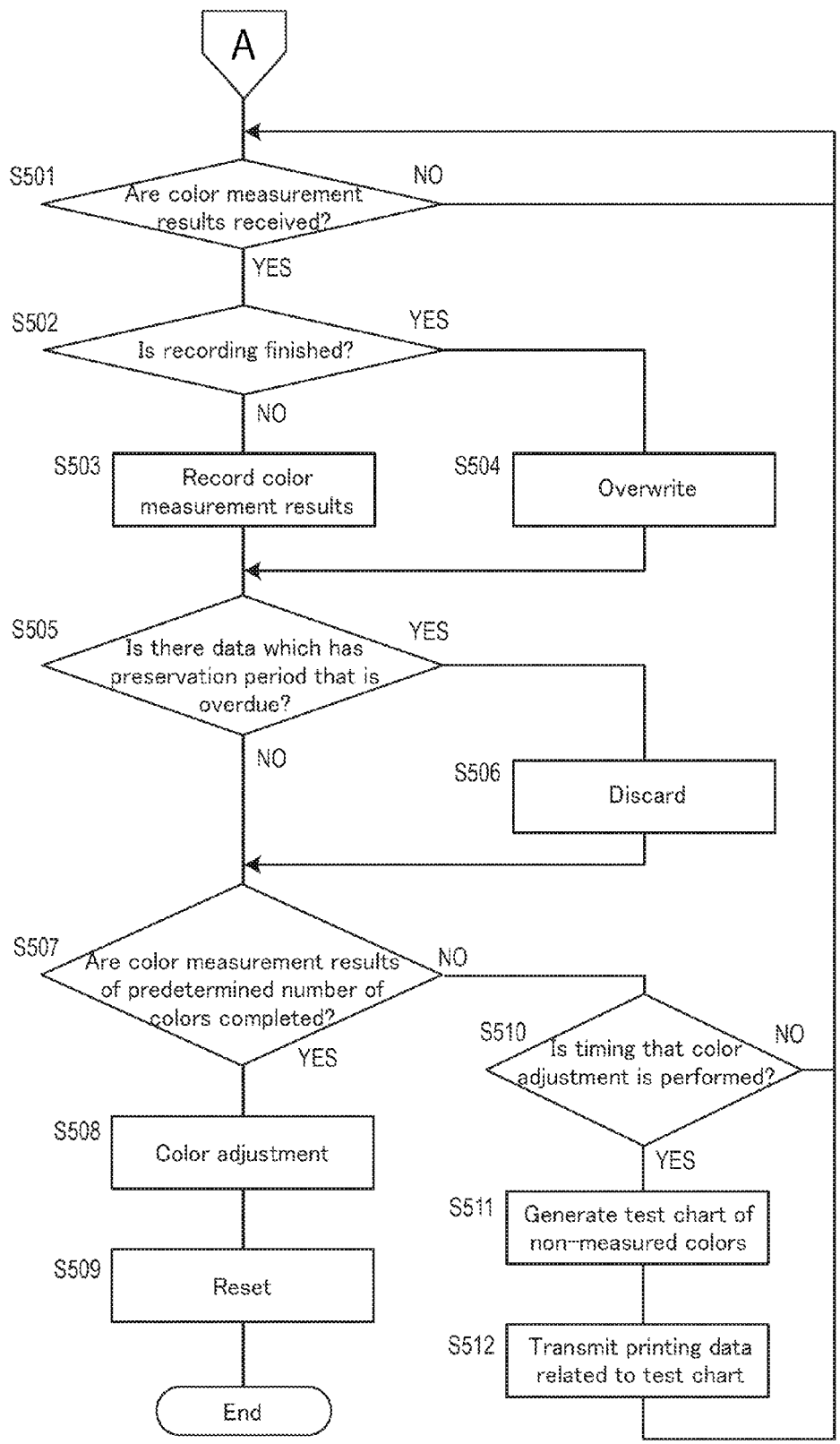
FIG. 9 is a flowchart illustrating the sequence of a color adjustment process according to a second embodiment.

FIG. 9 is a flowchart illustrating the sequence of the color adjustment process according to the second embodiment.

As shown in FIG. 9, after the printing instruction process shown in FIG. 5 ends, the information processing apparatus 10 starts the color adjustment process according to the second embodiment.

After the color adjustment process starts, the information processing apparatus 10 performs steps which are the same as steps S301 to S309 in the first embodiment (steps S501 to S509).

However, in the second embodiment, when a predetermined number of color measurement results are not completed for a predetermined color in step S507 (step S507: No), the process does not return to step S501. Further, the information processing apparatus 10 functions as the color adjustment unit 56, and determines whether or not it is a color adjustment execution timing that is set by the user (step S510). More specifically, the information processing apparatus 10 determines whether or not the color adjustment intervals, which are set in the color adjustment setting process, elapse after the previous color adjustment is executed.

When the color adjustment intervals do not elapse, the information processing apparatus 10 determines that it is not the timing that the color adjustment is executed (step S510: No), and returns the process to step S501.

On the other hand, when the color adjustment intervals elapse, the information processing apparatus 10 determines that it is timing that the color adjustment is executed (step S510: Yes), and the information processing apparatus 10 functions as the color adjustment unit 56 and generates a test chart for colors which are not measured (step S511). More specifically, the information processing apparatus 10 specifies a color which is not present in the identification information 151 of the color information table 150 from among the predetermined colors (for example, all the colors of the color patches which are included in the general test chart). Subsequently, the information processing apparatus 10 creates a test chart which only includes the color patch of the specified color.

Further, the information processing apparatus 10 converts the created test chart for a color which is not measured into printing data (for example, PDL data) which, can be interpreted by the image forming apparatus 20, and transmits the resulting printing data to the image forming apparatus 20 as the printing job (step S512).

Thereafter, the information processing apparatus 10 returns to the process to step S501.

At this time, on the side of the image forming apparatus 20, the printing process shown in FIG. 6 is performed, a test chart for a non-measured color transmitted from the information processing apparatus 10 is printed, color measurement is executed, and the color measurement result thereof is transmitted to the information processing apparatus 10.

As described above, in the second embodiment, even though a predetermined number of color measurement results for a predetermined color are not completed at timing that the color adjustment which is designated by the user is executed, a test chart which is configured from the color patches of non-measured colors is printed.

Thereafter, the information processing apparatus 10 receives color measurement results related to the test chart for the non-measured colors, and executes the color adjustment process shown in FIG. 7 again.

At this time, in step S507, since a predetermined number of color measurement results are necessarily completed for a predetermined color, the process proceeds to step S508. In step S508, the information processing apparatus 10 functions as the color adjustment unit 56, and the color adjustment is executed using the color measurement results of the test chart for the non-measured colors and the color measurement result which is recorded in the color information table 150 before the test chart is printed.

Thereafter, the information processing apparatus 10 resets the accumulation of the color measurement results, and ends the color adjustment process according to the second embodiment.

When the above-described color adjustment process is performed in the information processing apparatus 10, it is possible to acquire color measurement results corresponding to the number of colors which are necessary to maintain certain or higher accuracy when the color adjustment is executed even though a predetermined number of color measurement results are not completed at the timing that the color adjustment designated by the user is executed. Therefore, before the color adjustment is executed, a predetermined number of color measurement results are always completed, and thus the accuracy of the color adjustment is guaranteed. In addition, since the test chart to be printed includes only some colors, it is possible to shorten a time that is necessary to perform color adjustment compared to the related art in which the test chart of all of the color patches is printed and the color adjustment is executed.

Meanwhile, each process unit of each of the above-described flowcharts is acquired through division according to main process content for easy comprehension of the information processing apparatus 10 and the image forming apparatus 20. The present invention is not limited depending on a method of classification performed on process steps or the name thereof. It is possible to divide the processes performed by the information processing apparatus 10 and the image forming apparatus 20 into a larger number of processing steps. In addition, a larger number of processing steps may be performed in single process step.

Modification Example

In addition, each of the embodiments is intended to exemplify the gist of the invention and does not limit the invention. The larger number of substitutions, amendments, and modification examples are apparent to those skilled in the art.

For example, in each of the embodiments, when a color measurement result of the same color as the color measurement result which is recorded in the color information table 150 is newly acquired, the information processing apparatus 10 overwrites the previously recorded color measurement result with a newly acquired color measurement result. However, the present invention is not limited thereto. The newly acquired color measurement result may be removed, and the average value of the previously recorded color measurement result and the newly acquired color measurement result may be recorded in the color information table 150.

In addition, in each of the embodiments, whenever color adjustment is executed, the accumulation of color measurement results is reset, that is, all of the color measurement results 153 which are recorded in the color information table 150 are removed (steps S309 and S509). However, the present invention is not limited thereto. For example, the information processing apparatus 10 may not reset the accumulation of color measurement results in steps S309 and S509. In this case, whenever the color measurement result of the same color as the color measurement result which is recorded in the color information table 150 is newly acquired, the information processing apparatus 10 overwrites a previously recorded color measurement result with the newly acquired color measurement result. In addition, a color measurement result, the preservation period of which is overdue, may be not removed.

In addition, in each of the embodiments, the color measurement result 153 of the color information table 150 is removed based on the preservation period 154 which is set for every color measurement result 153 of the predetermined color. However, the present invention is not limited thereto. The preservation period 154 in association with each color measurement result 153 is equated, and a plurality of color measurement results 153 may be collectively removed.

In addition, in each of the embodiments, the color measurement is performed using the inline sensor which is arranged in the middle of the transport path through which the printed matter is transported from the image forming mechanism 25 to the post processing mechanism 27. However, the present invention is not limited thereto. For example, the color measurement may be performed immediately before the printed matter is discharged to the paper discharge area (for example, a paper discharge tray) by the post processing mechanism 27.

In addition, in the embodiments, the example in which the concentration conversion table is corrected is described as an adjustment method related to conversion of concentration characteristics. However, the present invention is not limited thereto. Any method may be used if it is possible to adjust conversion of concentration characteristics.

In addition, in the second embodiment, description is made such that the interval between the color adjustments is set to an equal interval (time, the number of sheets, and the like). However, the present invention is not limited thereto. The interval between the color adjustments may be set to be variable according to the frequency of use, the elapsed number of days after a toner cartridge is exchanged, and the like.

The above configurations of the printing system 1 are described as major configurations in order to describe the characteristics of each of the embodiments and the modification example. However, the invention is not limited to the configurations. In addition, the general configuration included in the printing system 1 is not excluded.

In addition, the respective functional configurations of the above-described printing system 1 are classified according to main process content in order to easily understand the respective functional configurations. The present invention is not limited by a component classification method or names. It is possible to classify the respective functional configurations as additional components according to the content of a process. In addition, it is possible to perform classification such that a single component performs additional processes.

In addition, a program which causes the information processing apparatus 10 and the image forming apparatus 20 to operate may be provided through a non-transitory computer readable recording medium such as an USB memory, a flexible disk, or a CD-ROM, and may be provided online via a network such as the Internet. In this case, a program which is recorded in the non-transitory computer readable recording medium is normally transmitted and stored in a ROM, an HDD, or the like. In addition, the program may be provided as, for example, an independent application, and may be built in the software of the information processing apparatus 10 or the image forming apparatus 20 as one function thereof.

In addition, it is possible to realize processes performed by the components of the respective functional configurations using a dedicated hardware circuit such as Application Specific Integrated Circuit (ASIC). In this case, the processes may be performed by a single hardware or a plurality of hardware.

The entire disclosure of Japanese Patent Application No. 2013-062610 filed on Mar. 25, 2013 including specification, claims, drawings and summary are incorporated herein by reference in its entirety.

What is claimed is:

1. A color printing system comprising:
   a specification unit that specifies an area which has predetermined colors from printing target image data;
   a printing unit that prints the image data;
   a color measurement unit that measures the colors of the area which is specified by the specification unit, with regard to a printed matter which is generated in such a way that the image data is printed by the printing unit;
   a recording unit that records color measurement results acquired by the color measurement unit whenever the image data is printed;
   a comparison unit for comparing a number of color measurement results acquired by the color measurement unit with a predetermined number; and
   a color adjustment unit that, when the comparison unit determines that the number of color measurement results acquired by the color measurement unit is equal to or greater than the predetermined number, executes color adjustment using the color measurement results.

2. The color printing system as claimed in claim 1, further comprising:
   a setting unit that sets a color adjustment execution timing, wherein, even when the predetermined number of color measurement results of the predetermined colors are not completed at the execution timing which is set by the setting unit, the printing unit prints a test chart which is configured from color patches of colors which are not recorded yet in the recording unit, the color measurement unit executes color measurement on the test chart, and the color adjustment unit executes the color adjustment using the color measurement results of the test chart and the color measurement results which are recorded in the recording unit.

3. The color printing system as claimed in claim 1, wherein the color measurement unit is a line sensor that can perform the color measurement on entire width of the printed matter.

4. The color printing system as claimed in claim 1, wherein, when color measurement results of a same color as the recorded color measurement results are newly acquired by the color measurement unit, the recording unit overwrites the color measurement results which are recorded in advance with the newly acquired color measurement results.

5. The color printing system as claimed in claim 1, wherein the recording unit removes the color measurement results that have periods which are overdue based on periods which are set for the respective color measurement results.

6. The color printing system as claimed in claim 1, wherein, when the color adjustment is executed by the color adjustment unit, the recording unit removes all of the recorded color measurement results.

7. A color printing method comprising the steps of:
   (a) specifying an area which has predetermined colors from printing target image data;
   (b) printing the image data;
   (c) measuring the colors of the area which is specified in the step (a) with regard to a printed matter which is generated in such a way that the image data is printed in the step (b);
   (d) recording color measurement results in the step (c) whenever the image data is printed;
   (e) determining whether a number of completed color measurement results is equal to or greater than a predetermined number; and
   (f) when the predetermined number of color measurement results of the predetermined colors are completed, executing color adjustment using the color measurement results.

8. The color printing method as claimed in claim 7, further comprising the step of:
   (g) setting a color adjustment execution timing, wherein, when the predetermined number of color measurement results of the predetermined colors are not completed at the execution timing that is set in the step (g), a test chart that is configured from color patches of colors which are not recorded yet in the step (d), color measurement is performed on the printed test chart, and the color adjustment is executed using the color measurement results of the test chart and the color measurement results which are recorded in the step (d).

9. The color printing method as claimed in claim 7, wherein the step (c) includes using a line sensor that can perform the color measurement on entire width of the printed matter.

10. The color printing method as claimed in claim 7, wherein, when color measurement results of a same color as the recorded color measurement results are newly acquired in the step (c), the step (d) includes overwriting the color measurement results which are recorded in advance with the newly acquired color measurement results.

11. The color printing method as claimed in claim 7, wherein the step (d) includes removing the color measurement results that have periods which are overdue based on periods which are set for the respective color measurement results.

12. The color printing method as claimed in claim 7, wherein, when the color adjustment is executed in the step (f), the step (d) includes removing all of the recorded color measurement results.

13. A non-transitory computer readable recording medium stored with a color printing program, the program causing a computer to execute a process comprising the steps of:
(a) specifying an area which has predetermined colors from printing target image data;
(b) printing the image data;
(c) measuring the colors of the area which is specified in the step (a) with regard to a printed matter which is generated in such a way that the image data is printed in the step (b);
(d) recording color measurement results in the step (c) whenever the image data is printed; and
(e) determining whether a number of completed color measurement results is equal to or greater than a predetermined number; and
(f) when the predetermined number of color measurement results of the predetermined colors are completed, executing color adjustment using the color measurement results.

14. The non-transitory computer readable recording medium as claimed in claim 13, wherein the program further causes the computer to execute a process comprising the step of:
(g) setting a color adjustment execution timing, wherein, when the predetermined number of color measurement results of the predetermined colors are not completed at the execution timing that is set in the step (g), a test chart that is configured from color patches of colors which are not recorded yet in the step (d), color measurement is performed on the printed test chart, and the color adjustment is executed using the color measurement results of the test chart and the color measurement results which are recorded in the step (d).

15. The non-transitory computer readable recording medium as claimed in claim 13, wherein the step (c) includes using a line sensor that can perform the color measurement on entire width of the printed matter.

16. The non-transitory computer readable recording medium as claimed in claim 13, wherein, when color measurement results of a same color as the recorded color measurement results are newly acquired in the step (c), the step (d) includes overwriting the color measurement results which are recorded in advance with the newly acquired color measurement results.

17. The non-transitory computer readable recording medium as claimed in claim 13, wherein the step (d) includes removing the color measurement results that have periods which are overdue based on periods which are set for the respective color measurement results.

18. The non-transitory computer readable recording medium as claimed in claim 13, wherein, when the color adjustment is executed in the step in (f), the step (d) includes removing all of the recorded color measurement results.

* * * * *